United States Patent

[11] 3,626,324

[72] Inventors Eric G. Lean
Mahopac;
Robert A. Myers, New York, both of N.Y.
[21] Appl. No. 869,636
[22] Filed Oct. 27, 1969
[45] Patented Dec. 7, 1971
[73] Assignee International Business Machines Corporation
Armonk, N.J.

[54] VOLUME REFLECTOR FOR LASER CAVITIES
5 Claims, 1 Drawing Fig.
[52] U.S. Cl..................................................... 331/94.5
[51] Int. Cl..................................................... H01s 3/05
[50] Field of Search........................................ 331/94.5; 350/160, 161

[56] References Cited
UNITED STATES PATENTS
3,174,044   3/1966   Tien .............................. 350/161 X

OTHER REFERENCES

Ambartsumyan, R. V., " 5A10(b)- A Laser with a Nonresonant Feedback," IEE Journal of Quantum Electronics, Vol. QE-2, No. 9, September, 1966 p. 442- 446.

*Primary Examiner*—Ronald L. Wibert
*Assistant Examiner*—T. Major
*Attorneys*—Hanifin & Jancin and John J. Goodwin ABSTRACT: A volume reflector which may be employed as one or both of the end mirrors of a laser cavity. A laser cavity is provided including an active medium which is excited to produce stimulated emissions of light. A reflective means is located at each end of the cavity to reflect the light back into the cavity. One or both of the reflective means is an acoustic cell which is connected to a source of input signal, preferably at a microwave frequency. When particular relationships are satisfied, the light impinging on the acoustic cell is reflected back 180° by the standing acoustic wave fronts throughout the volume of the acoustic cell.

PATENTED DEC 7 1971
3,626,324
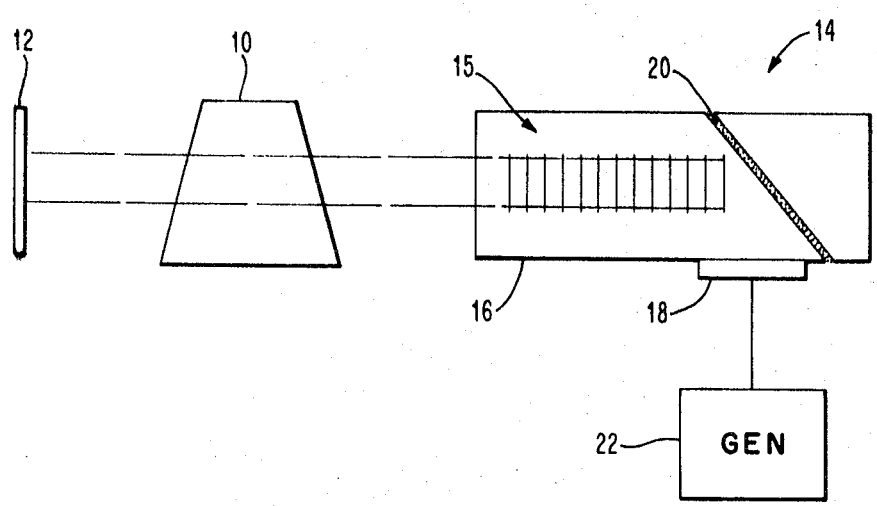
INVENTORS
ERIC G. LEAN
ROBERT A. MYERS
BY John J. Goodwin
ATTORNEY

VOLUME REFLECTOR FOR LASER CAVITIES

BACKGROUND OF THE INVENTION

1. Field of the Invention

The present invention relates to laser technology, particularly to laser cavities employing acoustic cells.

2. Prior Art

Acoustic cells have been used in combination with laser cavities for modulation and for deflecting light out of a laser cavity. The cavities of the prior art include pairs of conventional reflectors or mirrors and do not use the acoustic cell as a mirror. Some examples of the prior art are U.S. Pat. No. 3,297,876 issued Jan. 10, 1967 to A. J. DeMaria and U.S. Pat. No. 3,365,581 issued Jan. 23, 1968 to B. Tell et al.

SUMMARY

Laser cavities generally include two end mirrors which reflect the laser light within the cavity back through the active medium to sustain the lasing action. A well-known problem encountered in high-power lasers, especially in Q-switching or mode lock operation, is destruction of the mirrors. This occurs because of the very high power density which is localized on the mirror planes.

An object of the present invention is to provide a laser cavity having one or more end reflectors wherein the laser power density is distributed within a volume rather than on a surface plane.

Another object of the present invention is to provide laser cavity reflections by using the back scattering from ultrasonic waves in a solid or liquid acoustic cell.

A further object of the present invention is to provide an electronically variable transmission mirror for a laser cavity.

The foregoing and other objects, features and advantages of the invention will be apparent from the following more particular description of a preferred embodiment of the invention, as illustrated in the accompanying drawing.

The FIGURE in the drawing is a schematic representation of a laser cavity employing at least one ultrasonic cell as a volume reflector. In the FIGURE, a laser cavity is shown including an active medium 10, for example, a carbon diode laser medium and means for exciting the medium to produce stimulated emission of light. A first reflective means 12, which may be a plane mirror is located on one side of active medium 10. A second reflective means 14 is an acoustic cell including an acoustic delay medium 16 and an acoustic transducer 18.

The acoustic wave delay medium 16 can be either crystals (i.e., quartz) or a liquid cell. The acoustic transducer 18 is bonded to the side of one end of the acoustic cell 16 opposite to a diagonal plane surface 20 at the end of the delay medium 16. Transducer 18 is driven by electrical signals from a signal generator 22 suitably matched to transducer 18. Generator 22 provides a microwave frequency signal to transducer 18 which in turn produces acoustic waves to form a wave column 15.

The transducer 18 produces longitudinal acoustic waves which reflect from the diagonal surface 20 and result in shear acoustic waves propagated along the length of the delay medium 16. The reason that transducer 18 is located on the side of medium 16 rather than at the end, as is the case in most acoustic cells, is that a portion of the laser light passes through the length of the medium 16 to be coupled out of the cavity and transducer 18 must not be in its path. The remaining portion of the delay medium is attached to the diagonal surface 20 by suitable binder such as a balsam. The diagonal surface 20 provides a mismatch for acoustic waves but not for laser light. The angle of the diagonal surface is a function of the size and type of material used for delay medium 16.

As previously stated, the acoustic cell 14 functions as the reflective means of the laser cavity. Acoustic cell 14 is in the path of the laser light propagated by active medium 10. It is well known that the interaction of sound waves at microwave frequencies and electromagnetic waves at optical frequencies can be used to modify an optical beam by deflecting it in space. In the present invention, generator 22 produces a microwave signal at a selected frequency $f$, the resultant acoustic wavelengths produced in wave column 15 is $\Lambda=v/f$, where $v$ is the acoustic velocity of the delay medium 16. The frequency $f$ is selected such that the following relationship exists $$m\lambda_0/2n\Lambda=1 \quad (1)$$

where $m$ is an integer, $\lambda_o$ is the wavelength of the incident laser light, $n$ is the index of refraction of the delay medium and $\Lambda$ is the acoustic wavelength.

When expression (1) is satisfied by the selected microwave frequency $f$, the laser light is deflected back into the cavity at an angle of 180°. The incident laser light and the acoustic waves in wave column 15 interact throughout an interaction length $z$ in the column. More particularly, the laser light impinging on the wave column 15 interacts with the acoustic waves disposed in the wave column along a length $z$. For this reason, reflective means 14 is referred to as a volume reflector.

The incident laser light $I_1$ is depleted exponentially while the reflected laser light $I_2$ grows exponentially, both as a function of the interaction length $z$ and is expressed as follows:

$$I_1(z)=I_1(o)e^{-2\Gamma z} \quad (2)$$

where $I_1(o)$ is the incident light impinging on the front face of the wave column 15. As it enters the wave column $I_1(o)$ then decays exponentially and gives its energy to the reflected laser light $I_2$ by parametric interaction and $I_2$ grows exponentially. The constant $\Gamma$ in expression (2) involves the optical and elastic constants of the acoustic cell 14 and the driving acoustic power $P_s$ from transducer 18. The expression for the constant $\Gamma$ is as follows:

$$\Gamma=\frac{\pi}{\lambda_0}\left(\frac{\omega_2}{\omega_1}\right)^{1/2}\left(\frac{n^6 P^2}{v^3 \rho}\right)^{1/2}\left(\frac{P_s}{2}\right)^{1/2} \quad (3)$$

Where
- $\omega_1$ is the frequency of the incident light
- $\omega_2$ is the frequency of the reflected light
- $P$ is the photoelastic constant of the wave column material
- $\rho$ is the density of the wave column material
- $P_s$ is the acoustic power, and
- $v$ is the velocity of the acoustic waves.

Expression (3) is derived from the parametric interaction process between light waves and microwave acoustic waves and is more fully discussed in the publication "Interaction of Light and Microwave Sound," by C. F. Quate et al., Proceedings of the IEEE, Volume 53, No. 10, page 1,604, Oct. 1965.

To be effective as a laser mirror, the efficiency of the backward scattering of reflective means 14 must be relatively large, particularly if the gain of the laser is small.

The length of the delay medium L can be determined from equation (2) if the required reflectivity for the laser and the constant $\Gamma$ of a suitable material at a given acoustic power density $P_s$ are known. For example, if a reflectivity of 90 percent is assumed, the condition for the constant $\Gamma$ and the length of the delay medium L is calculated to be $$\Gamma L = 1.15 \quad (4)$$

In order to show that there are materials suitable for the volume laser reflector with reasonably small delay material length L, table 1 shows the parameter of acoustic cell materials for working embodiments to be provided for a 10.6 micron wavelength $CO_2$ laser and with an input acoustic power density $P_s$ of 2,000 watt/meter². The parameters are calculated employing expression (3) and (4). It should be noted that the acoustic power density $P_s$ of 2,000 watt/meter² which only amounts to a 0.2 watt total acoustic power in an acoustic column of 1 millimeter in diameter. The total acoustic power can be as high as 10 watts. The larger the acoustic power density, the shorter the delay medium length $L$ required. Another requirement of suitable materials for the volume laser reflectors is the low acoustic attenuation at the center frequency $f$ in which the condition of backward scattering given by equation (1) is satisfied. The attenuation of each material in table 1 is listed in the last column. The excess attenuation in the medium can be overcome by increasing the input acoustic power $P_a$ and the length $L$ of the delay medium.

TABLE I

| Material | $n$ | $v$ (Km/sec.) | $\Lambda$ (micron) | $f$ (GHz) | $\Gamma$ | $L$ (cm.) | Attenuation (db/cm.) |
| --- | --- | --- | --- | --- | --- | --- | --- |
| KRS-5 | 2.52 | 2 | 2.1 | 0.95 | $1.27 \times 10^2$ | 0.9 | 5 at 545 MHz. |
| Tellurium | 4.80 | 3.14 | 1.1 | 3 | $8.5 \times 10^2$ | 0.135 | 3 at 300 MHz. |
| GaAs | 3.1 | 5.3 | 1.7 | 3.1 | $1.12 \times 10^2$ | 1 | 6 at 630 MHz. |

What has been described is a volume reflector for a laser cavity employing the interaction between light waves and acoustic waves. The device is a volume reflector because it functions as if it were a thick mirror having multiple optical layers along a given length since the incident light is "reflected" by the acoustic waves along the length. Therefore, the reflective means of the present invention may be employed in high-power lasers without being destroyed.

The present invention also has utility for other than high power conditions. From equations (2) and (3) it is seen that the percentage of light coupled out of the cavity through the acoustic cell 14 can be varied by varying the input acoustic power conditions. Other advantages of the present invention are that reflective means 14 functions simultaneously as an intracavity modulator with a time constant $t=L/v$, where $L$ is the length of the acoustic cell and $v$ is the velocity of the acoustic waves. The reflective means 14 can be used as a Q-switch modulator with a repetition rate of $v/L$. By adjusting the cavity length such that the longitudinal mode spacing corresponds to the driving acoustic frequency, the reflective means 14 can also be used for mode locking the laser.

The figure shows a laser cavity having one reflective means 14 in accordance with the present invention and one conventional plane mirror 12. It is to be noted that a second reflective means 14 may be used in place of mirror 12.

While the invention has been particularly shown and described with reference to preferred embodiments thereof, it will be understood by those skilled in the art that various changes in form and details may be made therein without departing from the spirit and scope of the invention.

What is claimed is:

1. A resonant laser cavity comprising an active laser medium for producing stimulated emission of light disposed between two reflective means separated from each other on a central axis,
    at least one of said reflective means being an acoustic cell including a body of material for propagating acoustic waves and acoustic transducer means coupled to said body of material for producing acoustic waves in said material for deflecting a portion of said light into said cavity at an angle of 180°.

2. A resonant laser cavity according to claim 1 wherein said acoustic cell includes a body of material for propagating acoustic waves, an acoustic transducer coupled to said body of material and an electronic signal source coupled to said transducer.

3. A resonant laser cavity according to claim 2 wherein signal source is a source of microwave signal.

4. A resonant laser cavity according to claim 3 wherein said microwave signal source produces a microwave signal having a given frequency $f$ to produce acoustic wavelengths $\Lambda$ on said body of material which satisfy the expression $$m\lambda_o/2n\Lambda = 1$$

where $m$ is an integer, $\lambda_o$ is the wavelength of laser light incident on said body of material, and $n$ is the index of refraction of said body of material,
    said acoustic wavelengths reflecting a portion of said incident light at an angle of 180°.

5. A laser cavity according to claim 3 wherein said signal source is connected to the side of said body of material at a right angle to the direction of said emitted light and wherein said body of material includes a diagonal surface proximate to said signal source for deflecting said acoustic waves in said body of material in a direction at a right angle to said signal source.